United States Patent
Ahmed et al.

(10) Patent No.: US 11,081,922 B2
(45) Date of Patent: Aug. 3, 2021

(54) HAIRPIN WINDING ELECTRIC MACHINE

(71) Applicant: Ford Global Technologies, LLC, Dearborn, MI (US)

(72) Inventors: Adeeb Ahmed, Canton, MI (US); Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 16/428,099

(22) Filed: May 31, 2019

(65) Prior Publication Data

US 2020/0381969 A1 Dec. 3, 2020

(51) Int. Cl.
  *H02K 3/12* (2006.01)
  *H02K 3/28* (2006.01)
  *H02K 3/50* (2006.01)
  *H02K 3/38* (2006.01)

(52) U.S. Cl.
  CPC .............. *H02K 3/12* (2013.01); *H02K 3/28* (2013.01); *H02K 3/38* (2013.01); *H02K 3/505* (2013.01)

(58) Field of Classification Search
  CPC ............ H02K 3/12; H02K 3/38; H02K 3/505; H02K 3/50; H02K 3/28
  See application file for complete search history.

(56) References Cited

U.S. PATENT DOCUMENTS

| | | |
|---|---|---|
| 3,325,661 A | 6/1967 | Parsons |
| 6,498,414 B2 | 12/2002 | Asao |
| 2008/0042508 A1* | 2/2008 | Cai ........................ H02K 3/28 310/198 |
| 2020/0212747 A1* | 7/2020 | Deng .................... H02K 1/165 |

* cited by examiner

*Primary Examiner* — Tulsidas C Patel
(74) *Attorney, Agent, or Firm* — David B. Kelley; Brooks Kushman P.C.

(57) ABSTRACT

An electric machine includes a stator core defining circumferentially-arranged slots each having radial pin positions arranged to define radial layers and a hairpin winding including a first path of interconnected hairpins disposed in the stator core. The hairpins are arranged such that a leg portion of each hairpin is routed through a radial pin position of each slot wherein at least one uniquely-pitched hairpin is provided along the first path to induce a first shift in a trailing portion of the first path.

19 Claims, 8 Drawing Sheets

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

An electric machine includes a stator core defining circumferentially-arranged slots each having radial pin positions arranged to define radial layers and a hairpin winding including a first path of interconnected hairpins disposed in the stator core. The hairpins are arranged such that a leg portion of each hairpin is routed through a radial pin position of each slot wherein at least one uniquely-pitched hairpin is provided along the first path to induce a first shift in a trailing portion of the first path.

An electric machine includes a stator core defining circumferentially-arranged slots, each slot having radial pin positions arranged in adjacent pairs to define radial layers and a first electrical phase of a hairpin winding including a plurality of first hairpins interconnected to each other in series around two inner radial layers. The first electrical phase also includes a plurality of second hairpins interconnected to each other in series around two outer radial layers, the second hairpins being connected at a leading edge to the first hairpins via a uniquely-pitched hairpin.

An electric machine includes a stator core defining circumferentially-arranged slots, each slot having radial pin positions arranged in adjacent pairs to define radial layers. The electric machine also includes a first phase of a hairpin winding a plurality of first hairpins interconnected to each other in series and positioned in at least one inner radial layer, and a plurality of second hairpins interconnected to each other in series and connected to a trailing edge of the first hairpins by a unique-pitched hairpin and positioned at least one outer radial layer. The electric machine further includes a second phase of the hairpin winding a plurality of third hairpins interconnected to each other in series and positioned in at least one inner radial layer, and a plurality of fourth hairpins interconnected to each other in series and connected to a trailing edge of the third hairpins by a unique-pitched hairpin and positioned at least one outer radial layer. The electric machine further includes a third phase of the hairpin winding having a plurality of fifth hairpins interconnected to each other in series and positioned in at least one inner radial layer, and a plurality of sixth hairpins interconnected to each other in series and connected to a trailing edge of the fifth hairpins by a unique-pitched hairpin and positioned at least one outer radial layer. Each of the first phase, the second phase, and the third phase are interleaved such that a plurality of slots include a hairpin leg portion from both the first and second electrical phases within in a single slot.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Double-layer windings may be desirable for electric machine stator coils due to enhanced torque ripple and noise, vibration, and harshness (NVH) performance. Double-layer winding may also allow for an increased number of coils (compared with single layer winding) without increasing the number of slots in the stator, which may cause the need to narrow stator teeth width. Generally, double-layer windings are windings arranged such that two different electrical phases share the same slot location within the stator. At the same time, hairpin winding technology may be desirable related to the compactness, high fill factor, superior thermal performance, automated manufacturability as well as other benefits. Despite these advantages, hairpin technology can limit the available options for making connections between the conductors. Creating a double-layer winding with a hairpin winding configuration may cause the need for complicated hairpin formations, leading to an increase in cost and lowering compactness.

Described in more detail below, the present disclosure presents a unique connection arrangement to form a double-layer winding using hairpin technology with minimal changes in the basic hairpin geometry employed by a single-layer counterpart. Minimal modifications are made in a limited number of connections leaving the vast majority of the hairpin geometry unaltered. The modified connections also do not require additional jumpers or extra welding. Since the geometry is largely unmodified, the crown side formation of each hairpin remains simple and avoids the need for sharp bending of the hairpin conductor during forming.

Figure 1:
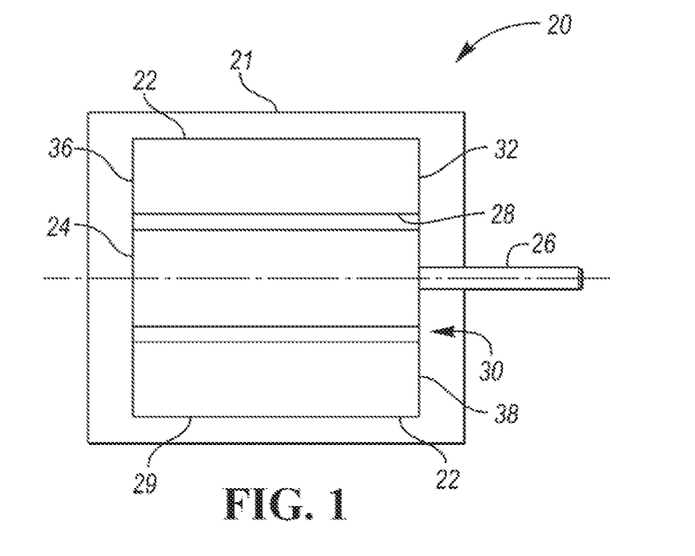
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by an electrical power source such as a traction battery of the vehicle. The traction battery may supply a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a suitable traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
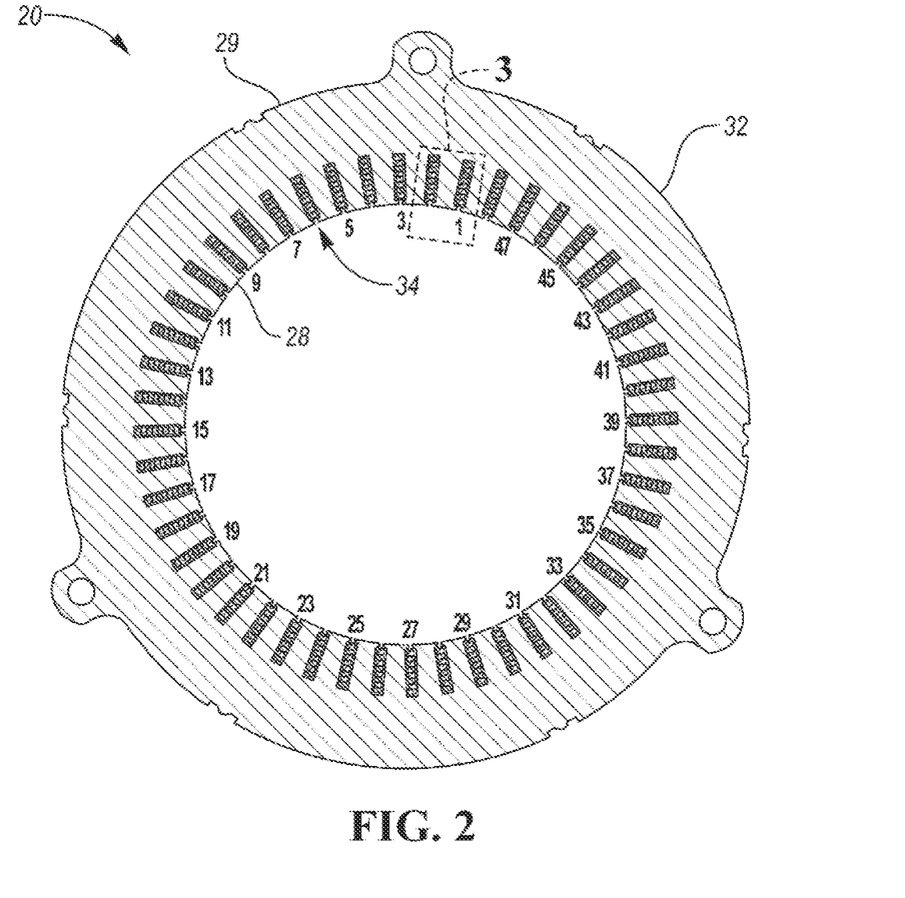
FIG. 2 is a cross-sectional end view of a stator of the electric machine.

Referring to FIGS. 1 and 2, the electric machine 20 includes a housing 21 that encloses the stator 22 and the rotor 24. The stator 22 is fixed to the housing 21 and includes a cylindrical stator core 32 having an inner diameter (ID) 28 that defines a hole 30 and an outer diameter (OD) 29. The stator core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a shaft 26 that extends through the housing 21. The shaft 26 is configured to couple with a drivetrain of the vehicle to output torque for vehicle propulsion or receive mechanical regenerative energy from vehicle motion.

The stator core 32 defines circumferentially-arranged slots 34 (see e.g., FIG. 2) around the stator core 32 and extending outward from the inner diameter 28. The slots 34 may be equally spaced around the circumference and extend axially from a first end 36 of the stator core 32 to a second end 38. In the illustrated embodiment, the stator core 32 defines forty-eight slots and has eight poles, but the stator core 32 may include more or fewer slots and/or poles in other embodiments. For example, the stator core 32 may define seventy-two slots and have eight poles.

The slots 34 are spaced by a circumferential distance measured between the center lines of two adjacent slots. This distance can be used as a unit of distance (hereinafter "a slot") for relating to, and measuring, other components of the stator 22. The distance unit "slot" is also sometimes referred to as "slot pitch" or "slot span." The slots 34 are also referenced by numbers 1 through 48 in the counterclockwise direction with the odd number slots being labeled for convenience. The slots may be characterized as odd slots (i.e., slots 1, 3, 5, etc.) and even slots (i.e., slots 2, 4, 6, etc.). The odd and even designation is for ease of description in explaining the arrangement of the windings 40, and the structure of odd and even slots may be the same.

The electric machine 20 includes hairpin windings 40 routed through the slots 34 of the stator core 32. Hairpin winding configurations can improve efficiency for electric machines used in vehicles as well as other applications. The hairpin windings 40 improve efficiency by providing a greater amount of stator conductors to reduce resistance of the winding 40 without encroaching into space reserved for the electrical steel and the magnetic flux path. The hairpin windings 40 may be arranged as wave windings in which the windings 40 weave from pole to pole in a wave-like pattern.

One particular challenge with hairpin winding is matching the electric machine design to the desired torque-speed curve. An important step in configuring an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While such arrangements may also be available for hairpin windings, the limiting factors are very different for pre-formed hairpins, thus resulting in smaller range of feasible choices. More specifically, while the possible number of poles, slots per pole, and layers can be the same between the two technologies, it is not practical using a hairpin winding to have as many turns per coil as in a stranded winding. Each hairpin needs to be connected to the next hairpin by welding, soldering or other suitable electrical connection, and needs to be bent according to a specific shape in order to make the connection possible. This limits the number and size of the conductors that can be within a single slot. An additional challenge is creating parallel circuits that are balanced (i.e., not causing large circulating currents in the loop formed by the parallel circuits due do dissymmetry) and have reasonably complex connections.

The electric machine 20 of the present disclosure solves these and other problems. The electric machine 20 may be a three-phase current electric machine in which the hairpin windings 40 are arranged in a U phase, a V phase, and a W phase. In the examples of the present disclosure, each phase includes a plurality of individual hairpin conductors arranged in parallel winding paths.

Figure 3:
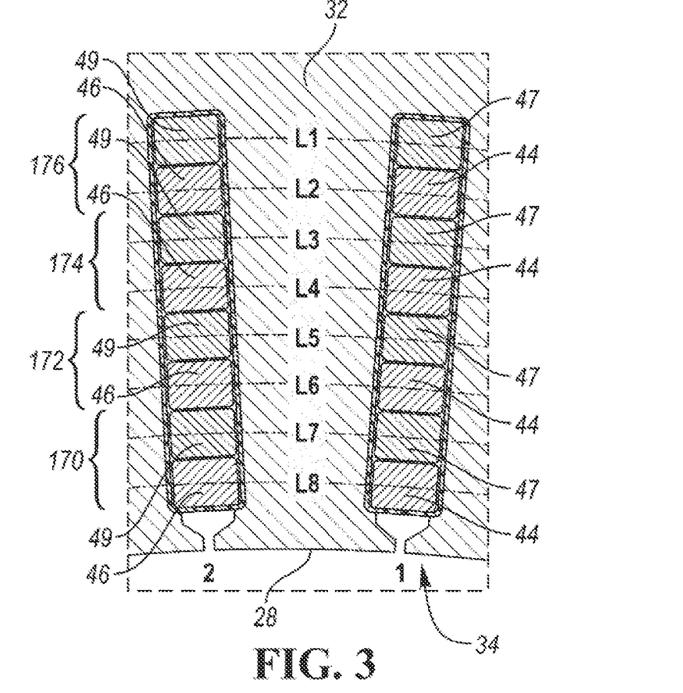
FIG. 3 is a magnified view of a portion of FIG. 2.

Referring to FIG. 3, the slots 34 may include an inner radial layer 170 of hairpins, an inner middle radial layer 172 of hairpins, an outer middle radial layer 174 of hairpins, and an outer radial layer 176 of hairpins. Each of the layers may include at least two radial pin positions that are adjacent to each other. In the illustrated embodiment, each slot 34 has eight sequential pin positions (i.e., L1 through L8) in a one-by-eight linear arrangement, however, other arrangements are contemplated. The first position L1, is nearest the OD 29 of the stator core 32 and the eighth position L8 is nearest the ID 28 of the stator core 32. The innermost radial layer 170 includes both the seventh position L7 and the eighth position L8. The inner middle radial layer 172 includes both the fifth position L5 and the sixth position L6. The outer middle radial layer 174 includes both the third position L3 and the fourth position L4. The outermost radial layer 176 includes both the first position L1 and the second position L2.

Figure 5:
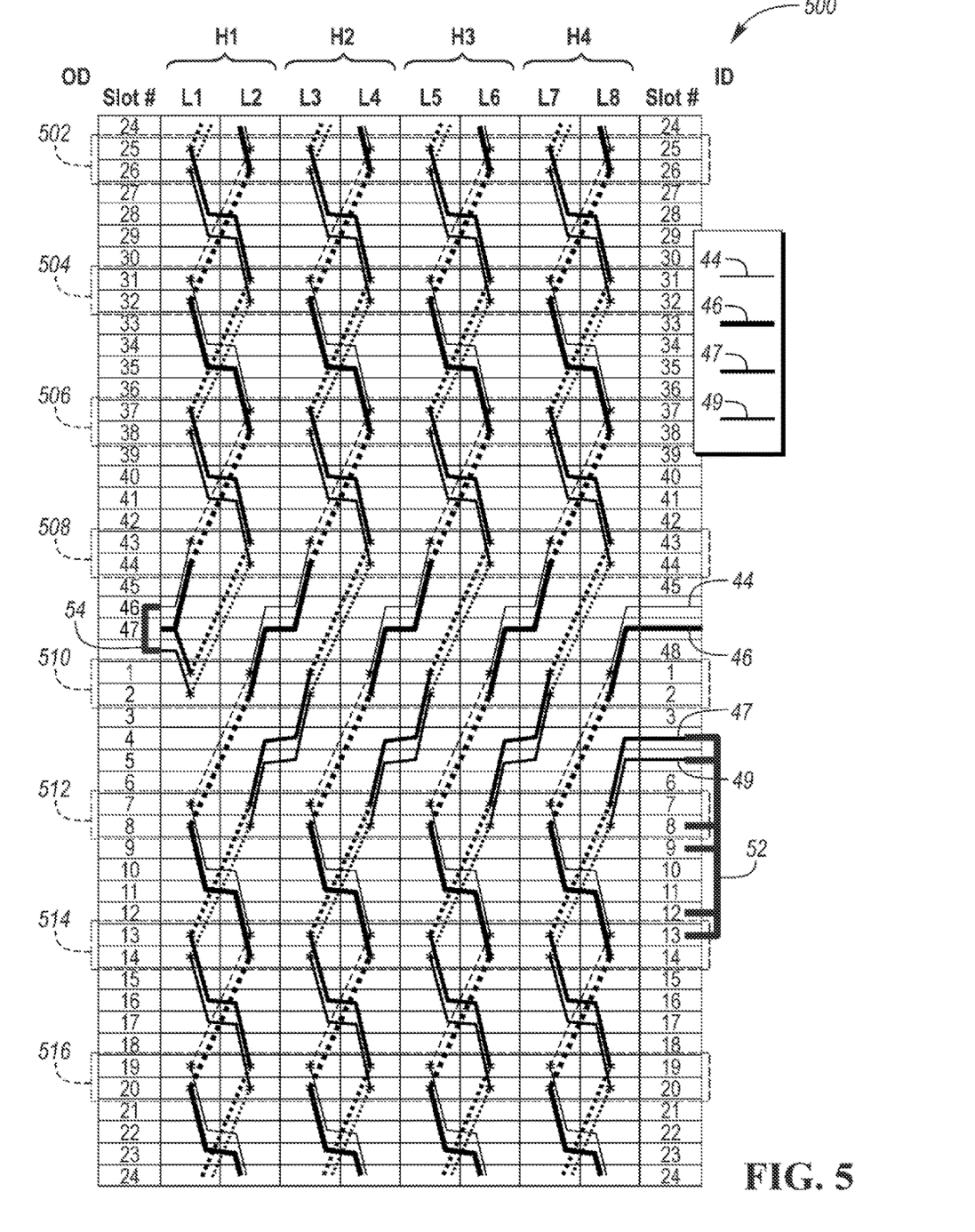
FIG. 5 is a winding diagram of a U phase of a single-layer winding looking from a weld side of the stator.

In some examples, each of the slots 34 contains windings corresponding to a single electrical phase (e.g., See FIG. 5: slot 1 only contains the U phase). In other examples, and as explained in more detail below, double-layer windings are arranged such that certain slots contain windings corresponding to at least two electrical phases in a single slot (e.g., See FIG. 6 and FIG. 9: slot 2 contains the U phase in positions L5 through L8 and also contains the W phase in positions L1 through L4). The phases are arranged in groups to occupy adjacent slots in each of the poles (e.g., portions of slots 1 and 2 contain the U phase, where portions of slots 3 and 4 contain the V phase, and portions of slots 6 and 7 contain the W phase).

Figure 4A:
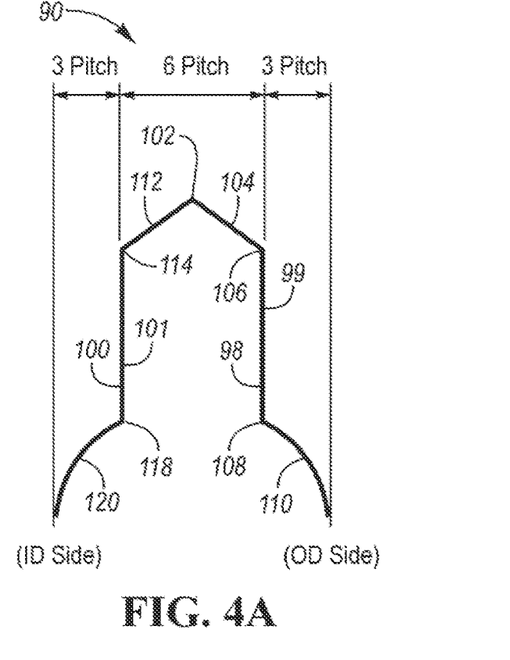
FIG. 4A is a front view of a regular hairpin
Figure 4B:
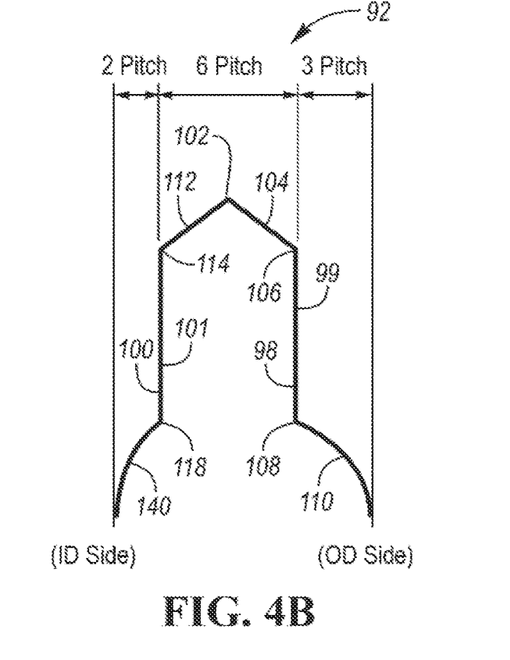
FIG. 4B is a front view of a short-pitch hairpin.

Referring collectively to FIG. 4A and FIG. 4B, the hairpins are schematically depicted to show the general configuration. The hairpins are generally U-shaped and include a pair of legs joined by a crown. Each of a plurality of hairpins are installed in the stator core 32 by routing each leg portion through a corresponding one of the slots 34. Each hairpin may be installed from the same end of the stator core 32 (e.g., from end 36) so that once installed all of the crowns are located on one end of the stator, and the ends of the legs all are located on the opposing end (e.g., end 38). Generally, end 36 may be referred to as the crown end and end 38 may be referred to as the weld end. Once installed, the legs of the hairpins are bent away from each other to form twists that connect with the twists of other hairpins. The ends of corresponding hairpins are joined by an electrically conductive connection such as a weld. The connections may be arranged in rows. The windings 40 may be jumper-less (i.e., each hairpin is interconnected to another hairpin directly). A jumper is a conductor that is typically disposed at one of the ends of the stator core, i.e., does not extend through a slot, and interconnects hairpins that are spaced far enough apart that they cannot be directly connected to each other. Jumpers add material to the windings and require additional manufacturing. Costs can be reduced, and manufacturing efficiencies can be gained, by designing windings that do not require jumpers.

Each arrangement may include one or more types of hairpins that differ in shape or size. Regular hairpin 90 may be formed from a single piece of metal such as copper, aluminum, silver, or any other electrically conductive material. The hairpin 90 may include a first leg 98 joined to a second leg 100 at a vertex 102. The first leg 98 is disposed within in one of the slots 34 and the second leg 100 is disposed in another of the slots 34 that is spaced apart by a span of slots. The regular hairpin 90 may have a span equal to the number of slots per pole, which is six slots in the example presented herein. Thus, if the first leg 98 was in Slot 1, the second leg 100 would be in Slot 7. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a twist portion 110 that is angled outward at a second bend 108. The second leg 100 includes a straight portion 101 disposed within a slot 34 and a first angled portion 112 that extends between the vertex 102 and the straight portion 101. The first and second angled portions 104, 112 and the vertex by be collectively referred to as a crown. The straight portion 101 and the angled portion 112 are joined at a first bend 114. The second leg 100 also includes a twist 120 that is angled outward at a second bend 118. The twists 110, 120 are angled in opposing directions to extend away from the hairpin 90 to connect with adjacent pins of the wiring path. In other example types of pins, the twists may extend in the same direction. The twists 110, 120 may have a pitch span that is equal to the pin span divided by 2, which in the example of FIG. 4A is three (6/2) in the illustrated embodiment. Thus, the regular pins 90 have a total pitch span of twelve slots.

The regular hairpin 90 may be fabricated by first forming the vertex 102, the first angled portions 104, 112, and two extended straight portions. Then, the hairpin 90 is installed into the stator 22 by inserting the extended straight portions into the slots 34 of the stator 22. The second bends 108, 118 and the twists 110, 120 may be formed after the hairpin 90 is installed through the slots by bending the extended legs as desired. The first and last regular pins of a wiring path may have a longer or shorter twist to facilitate connection with the terminal leads or neutral connections.

Referring to FIG. 4B, an alternate type of hairpin is a short-pitch pin 92. The short-pitch hairpin 92 has a shorter slot span than the regular pins 90 (e.g., the regular hairpin defines a pitch span of N slots). In the example of FIG. 4B, the short-pitch hairpin 92 is shorter by one slot (e.g., a pitch span of N−1 slots). The construction of the short-pitch hairpin 92 is similar to that of regular hairpins 90 albeit with a modified twist 140 that is arranged with a reduced pitch span. In the example of FIG. 4B the short-pitch hairpin 92 is provided with a total pitch span of eleven slots while the span between the first leg 98 and the second leg 100 remains at 6 slots. Discussed in more detail below the reduced span of the twist 140 allows the second leg 100 to be spaced 5 slots from a first leg 100 of an adjacent hairpin thus providing an adjusted spacing.

A neutral connection 52 may include a body such as a strip of conductive metal or other material. The neutral connection 52 includes openings that connect with hairpins. In the examples of the present disclosure, the neutral connection defines six openings grouped in pairs of two. Each of the groupings are associated with one of the phases such that each of the U phase, The V phase, and the W phase is allocated two openings. A weld portion near a twist of a respective pin is received in one of the openings of the neutral connection 52. The twists that connect to the neutral connection 52 may be lengthened to accommodate the weld portion and provide clearance for the neutral connection 52 to be attached outside of the main portions of the windings 40.

A double-layer winding is formed by selectively locating at least one uniquely-pitched hairpin having a modified twist side welding. The crown side of all of the hairpins are constructed with a standard pitch span. The vast majority of the twist sides are constructed with same pitch, with only a select number of hairpins including the smaller pitch of the short-pitch pin. As discussed above, a 48 slot stator geometry may include hairpins having a crown side pitch of 6 and a twist side pitch of 3 for most pins, while certain uniquely-pitched hairpins have a twist side pitch of 2. By introducing a single slot shift in the connection, a double-layer winding may be formed. The winding can be treated as two single-layer windings connected in series with a single slot shift in the connection between the two.

Referring to FIG. 5, winding diagram 500 depicts a U phase of a single-layer winding looking from a weld side of the stator. Each column represents a slot location of the stator stack segments having reference numbers from 1 through 48. Each row represents a radial layer positioned within each respective slot having references L1 toward the outer diameter side through L8 toward the inner diameter side. As discussed above, the positions within the slots are generally arranged as paired radial layers having references H1 though H8. The outermost radial layer H1 includes both the first position L1 and the second position L2. The outer middle radial layer H2 includes both the third position L3 and the fourth position L4. The inner middle radial layer H3 includes both the fifth position L5 and the sixth position L6. The innermost radial layer H4 includes both the seventh position L7 and the eighth position L8.

The U phase may include a first path (U1) 44, a second path (U2) 46, a third path (U3) 47, and a fourth path (U4) 49. The paths are formed by a plurality of interconnected hairpins disposed though the slots around the circumference of the stator. In the examples of the present disclosure, each of the paths of interconnected hairpins includes sixteen pins that are connected end-to-end to form a continuous conductor between a terminal (not shown) and the neutral connection 52. The first path 44 and second path 46 each include a first end that starts at the U-phase terminal on the inner diameter side of the stator, and a second end that ends on the outer diameter side of the stator. The first path 44 and the second paths 46 may wind around the stator core approximately four times. As the pins are routed circumferentially around the stator, select locations index across layers H4 through H1 so that the paths end on the outer diameter side.

The third path 47 starts at the second end of the second path 46, and the fourth path 49 starts at the second end of the first path 46. Based on the slot locations of the example of FIG. 5, the connection between the first path 44 and the fourth path 49 is made via a jumper connection 54, and the connection between the second path 46 and the third path 47 is made directly without a jumper. The third path 47 and fourth path 49 also include plurality of interconnected pins routed circumferentially around the stator and having select locations that index across layers H1 through H4 so that the paths end on the inner diameter side. The third and fourth paths 47, 49 may wind around the stator core approximately four times and end near the ID 28 at the inboard neutral connection 52. Each of the third path 47 and fourth path 49 are connected to an inboard neutral connection 52 on the inner diameter side. While the location of the neutral connection is provided by way of example, it should be appreciated that other locations may be suitable based on the particular application. The series connections of two of the paths effectively creates two parallel paths of the of the U phase.

Also, the paths may be arranged in pairs with the first path 44 and second path 46 being a pair, and the third path 47 and the fourth paths 49 being a pair according to the routing of the hairpins. The paths may be referred to as pair because these paths wind through the stator core 32 in the same direction and adjacent to each other.

Diagram 500 represents a single-layer configuration where only one phase passes through each respective stator slot. Regions 502, 504, 506, 508, 510, 512, 514, and 516 indicate the eight pairs of slot positions through which the U1 hairpin windings are routed. As can be seen in diagram 500, each of the respective slots of regions 502 through 516 have all eight positions L1 through L8 occupied by the single U phase. In a single-layer configuration the V phase and W phase windings with regions having slots that are dedicated to each single phase, respectively.

Figure 6:
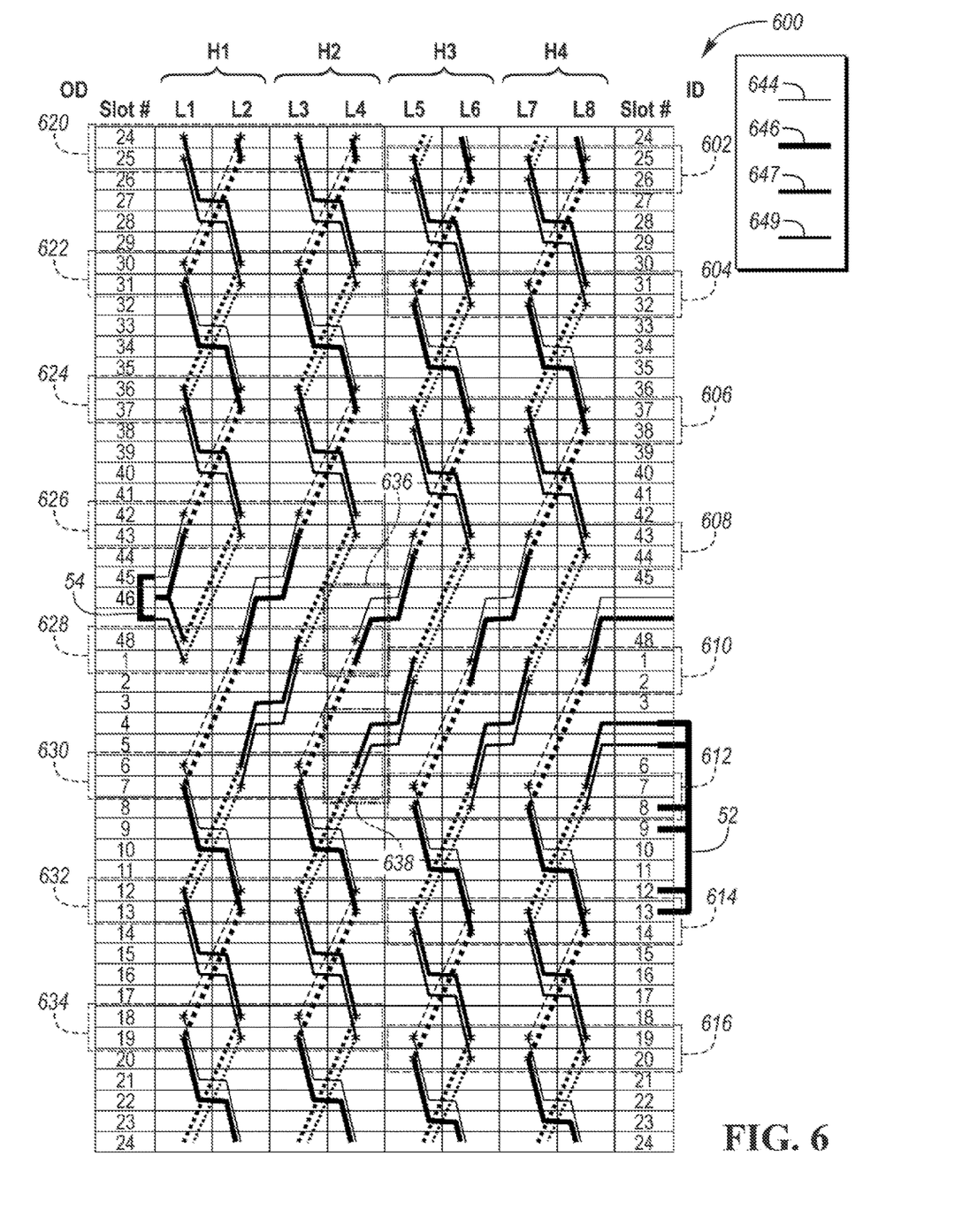
FIG. 6 is a winding diagram of a U phase of a double-layer winding looking from a weld side of the stator.

Referring to FIG. 6, winding diagram 600 depicts a U phase of a double-layer winding looking from a weld side of the stator. As described above, a double-layer winding is a winding where two different phases of wiring occupy different portions of a single common slot. According to aspects of the present disclosure, a double-layer hairpin winding is configured by selectively introducing uniquely-pitched hairpins at selected locations to generate a unique connection pattern with largely the same hairpin components. Specifically, four unique connections are implemented on the twist side (marked with dotted rectangle) of selected hairpins. According to some examples, a short-pitch hairpin is employed at these locations which has a unique pitch of 2 on one of the twist sides as opposed to the standard pitch of 3. The effect is to induce a shift of the relative spacing between the legs of adjacent hairpins from 6 to 5 to adjust the routing of the U phase along each path.

Similar to the single-layer example discussed above in reference to diagram 500, the double-layer U phase shown in diagram 600 includes a first path (U1) 644, a second path (U2) 646, a third path (U3) 647, and a fourth path (U4) 649, with each path formed by a plurality of interconnected pins. Also similar to previous examples, the first path 644 is connected in series to the fourth path 649 and the second path 646 is connected to the third path 647 near the outer diameter of the stator. The third path 647 and fourth path 649 terminate in the first and second nodes, respectively, of the neutral bridge 52.

The inner positions L5 through L8 (and thus regions 602, 604, 606, 608, 610, 612, 614, and 616) are unchanged relative to the single-layer configuration. However, the insertion of the short-pitch hairpins within each path shifts the pattern of stator slots through which the pins are routed. When switching from position L5 to L4 for each path, the corresponding hairpin is given a shorter pitch of 2 instead of 3 on the twist side. This single modification allows for a double-layer winding configuration because the slot shift for outer layers L1 through L4 creates space for routing hairpin windings of a different phase in the same slot. Regions 620, 622, 624, 626, 628, 630, 632, and 634 are shifted by one slot for the outer layers. Several slots remain dedicated to the single U phase (i.e., slot 1, 7, 13, 19, 25, 31, 37, and 43 all include only U phase windings). The adjacent slots on either side of the single phase slots now have space to accommodate windings of a different phase (either the V phase or W phase). Region 636 highlights the shift for the first path 644 and the second path 646. Likewise, region 638 highlights the shift for the third path 647 and fourth path 649.

Figure 7:
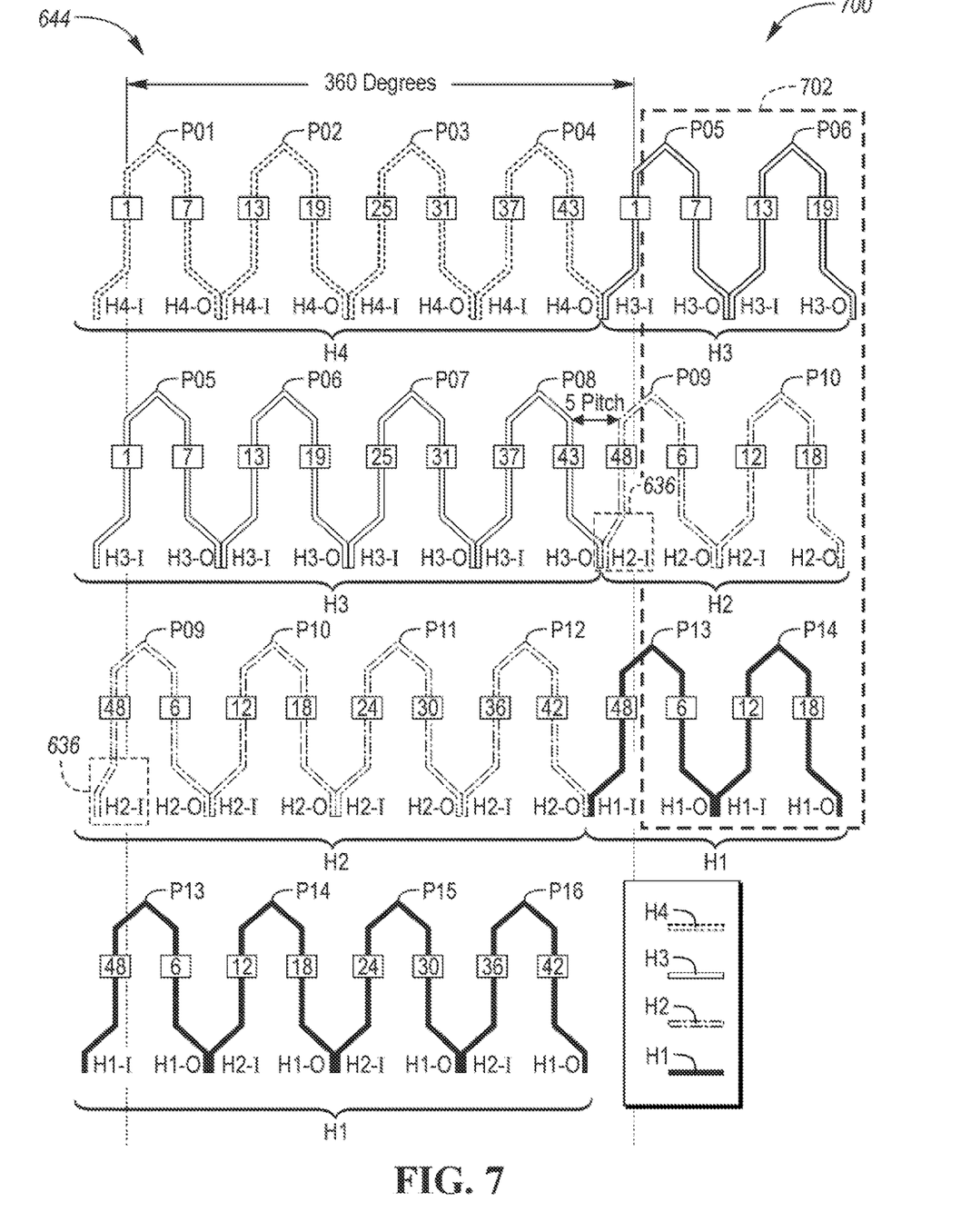
FIG. 7 is a diagrammatical view of select hairpin connections of a double-layer first path of the U phase.

Referring to FIG. 7, hairpin connection diagram 700 presents another visualization of the double-layer configuration of the present disclosure. The first path 644 is schematically represented by a series of interconnected hairpins P01 through P16. Hairpins P01 through P04 correspond to the innermost radial layer H4. Hairpins P05 through P08 correspond to inner middle radial layer H3. Hairpins P09 through P12 correspond to outer middle radial layer H2. Hairpins P13 through P16 correspond to innermost radial layer H1. The first path 644 begins with pin P01 having a trailing leg in slot 1 and a leading leg disposed within slot 7. The trailing leg of pin P01 is also connected to the terminal by a terminal lead at the twist end H4-I. The first path 644 advances in a counterclockwise direction when viewed from the weld end 38, which is to the right in FIG. 7. The terms "leading leg" and "trailing leg" refer to the position of the legs relative to the direction of advancement of the path.

Pin P02, a regular pin, has a trailing leg disposed in slot 13 and a leading leg disposed in slot 19, providing a standard pitch span of six slots. The twist portion of the leading leg of P01 is attached to the twist portion of the trailing leg of P02 by a connection 212 near slot 10. The connection may be a weld, such as a laser weld. P03, also a regular pin 90, has a trailing leg disposed within slot 25 and a leading leg disposed within slot 31. Similarly, the twist portion of the leading leg of P02 is attached to the twist portion of the trailing leg of P03 by a connection near Slot 22. Pins P03 and P04 are connected in similar fashion and wrap almost 360 degrees around the stator circumference such that the innermost radial layer H4 concludes at a twist portion of the leading leg of P04 at around slot 46.

The inner middle layer H3 advances in the same fashion as the innermost radial layer H4 and occupies the same slots around the circumference of the stator. Specifically, hairpins P05 through P08 are connected in series and the innermost radial layer H4 terminates around slot position 46. The region 702 includes repeated representations of certain hairpins that wrap to the next row of the connection diagram 700 to show the connections between each of the layers. In the example hairpins P05 and P06 are each shown twice to illustrate a mapping of the connection between the innermost layer H4 and the inner middle layer H3.

The outer middle layer H2 initiates with a uniquely-spaced short-pitch hairpin P09 that causes the outer middle layer H2 to advance relative to the standard pin spacing of layers H4 and H3. That is, the trailing edge side of P09 includes 2 slot pitch causing the spacing between the leading leg of P08 and the trailing edge of P09 to be 5 slots. The reduced spacing portion is indicated by region 636 as discussed above. This single modification can create a double layer winding. The remaining hairpins of the outer middle layer H2 (i.e., hairpins P10, P11, and P12) are regular hairpins having a standard slot pitch of 6 slots. Both of the V phase and W phase may similarly include a modified spacing in select hairpins to cause and advancing of one or more layers to cause a double-layer winding. According to aspects of the present disclosure, each of the paths of the U phase, the V phase, and the W phase includes 16 hairpins with one uniquely-pitched hairpin provide along each respective path.

Figure 8:
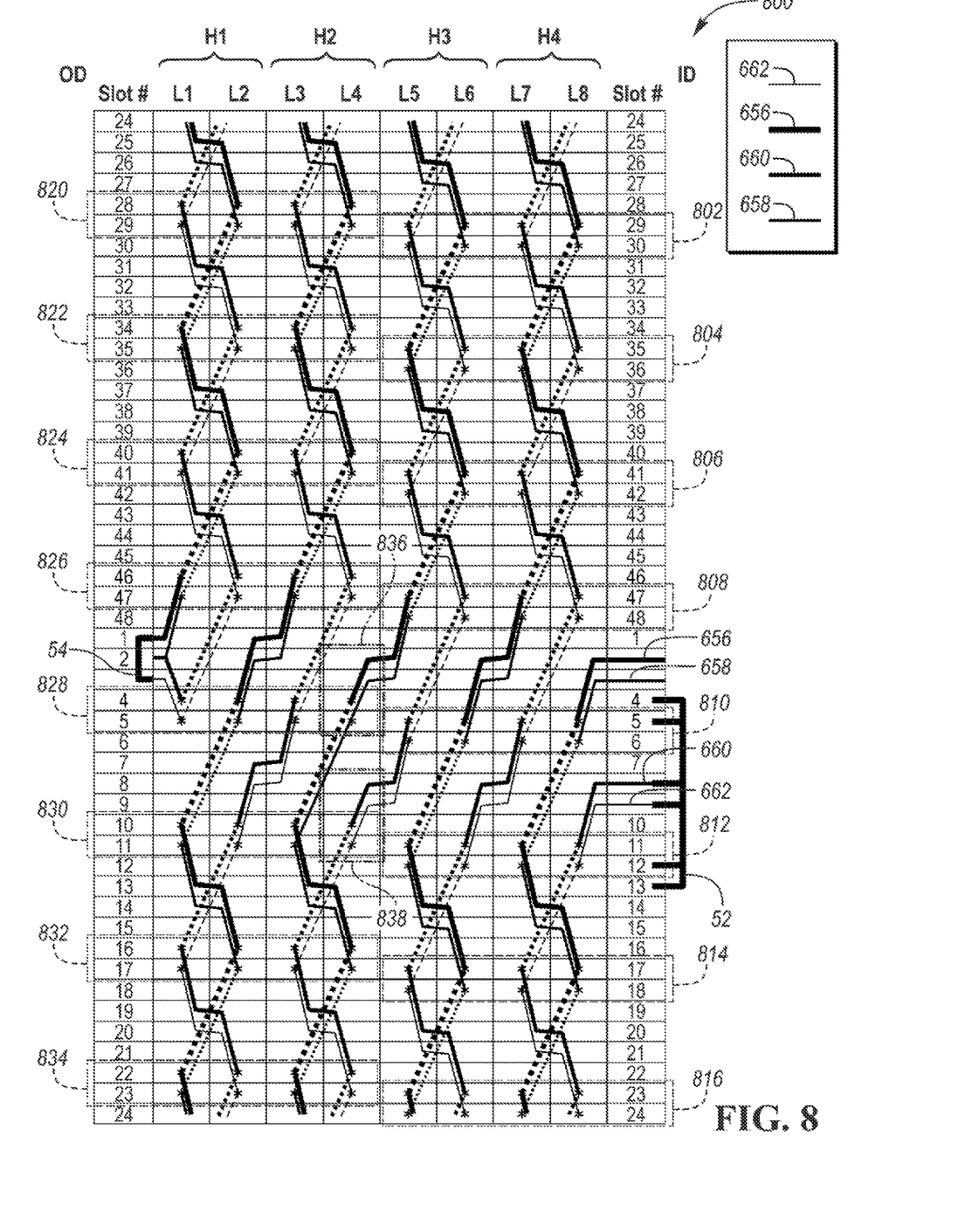
FIG. 8 is a winding diagram of a V phase of a double-layer winding looking from a weld side of the stator.

Referring to FIG. 8, winding diagram 800 depicts a V phase of a double-layer winding looking from a weld side of the stator. The V phase may include a first path (V1) 656, a second path (V2) 658, a third path (V3) 660, and a fourth path (V4) 662. Similar to the U phase described above, the paths are formed by a plurality of interconnected pins. Each of the first path 656 and second path 658 includes a first end that starts at the V-phase terminal and a second end that connects to the fourth path 662 and third path 660, respectively. Each opposing end of the third path 660 and fourth paths 662 connects to the third and fourth nodes, respectively, of the neutral connection 52. The paths 656, 658, 660, 662 are arranged in pairs each connected in series to effectively create a two path arrangement in a double-layer configuration.

The inner positions L5 through L8 (and thus regions 802, 804, 806, 808, 810, 812, 814, and 816) are unchanged relative to a single-layer configuration. However, the insertion of the short-pitch hairpins within each path shifts the pattern of stator slots through which the pins are routed. When switching from position L5 to L4 for each path, the corresponding hairpin is given a shorter pitch of 2 instead of 3 on the twist side. This single modification allows for a double-layer winding configuration because the slot shift for outer layers L1 through L4 creates space for routing hairpin windings of a different phase in the same slot. Regions 820, 822, 824, 826, 828, 830, 832, and 834 are shifted by one slot for the outer layers. Several slots remain dedicated to the single V phase (i.e., slot 5, 11, 17, 23, 29, 35, 41, and 47 all include only V phase windings). The adjacent slots on either side of the single phase slots now have space to accommodate windings of a different phase (either the U phase or W phase). Region 836 highlights the shift for the first path 656 and the second path 658. Likewise, region 838 highlights the shift for the third path 660 and fourth path 662.

Figure 9:
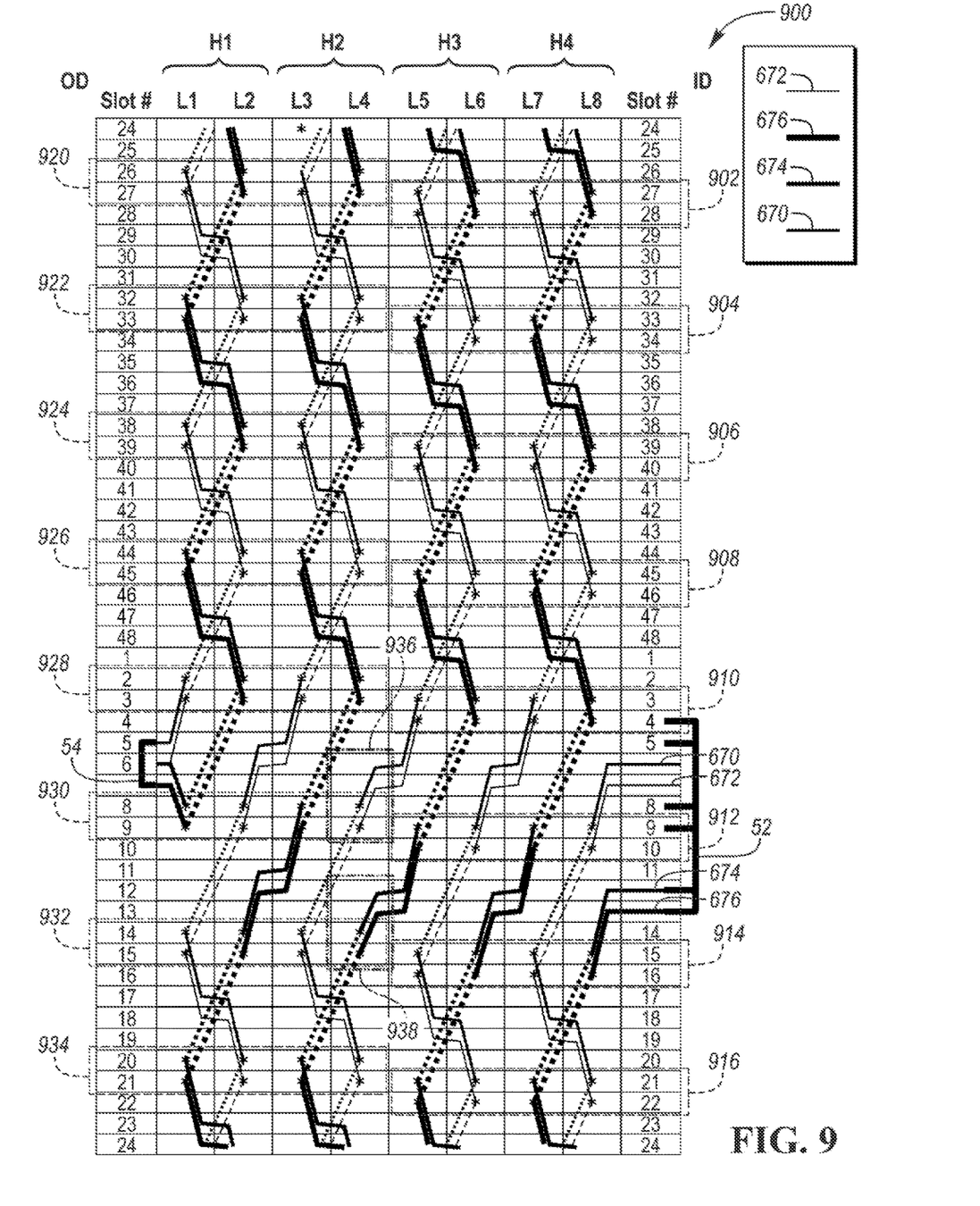
FIG. 9 is a winding diagram of a W phase of a double-layer winding looking from a weld side of the stator.

Referring to FIG. 9, winding diagram 900 depicts a W phase of a double-layer winding looking from a weld side of the stator. The W phase may include a first path (W1) 670, a second path (W2) 672, a third path (W3) 674, and a fourth path (W4) 676. Similar to the U phase and V phase described above, the paths are formed by a plurality of interconnected pins. Each of the first path 670 and second path 672 includes a first end that starts at the W-phase terminal and a second end that connects to the fourth path 676 and third path 674, respectively. Each opposing end of the third path 674 and fourth path 676 connects to the fifth and sixth nodes, respectively, of the neutral connection 52. The paths 670, 672, 674, 676 are arranged in pairs each connected in series to effectively create a two path arrangement in a double-layer configuration.

The inner positions L5 through L8 (and thus regions 902, 904, 906, 908, 910, 912, 914, and 916) are unchanged relative to a single-layer configuration. However, the insertion of the short-pitch hairpins within each path shifts the pattern of stator slots through which the pins are routed. When switching from position L5 to L4 for each path, the corresponding hairpin is given a shorter pitch of 2 instead of 3 on the twist side. This single modification allows for a double-layer winding configuration because the slot shift for outer layers L1 through L4 creates space for routing hairpin windings of a different phase in the same slot. Regions 920, 922, 924, 926, 928, 930, 932, and 934 are shifted by one slot for the outer layers. Several slots remain dedicated to the single W phase (i.e., slot 3, 9, 15, 21, 27, 33, 39, and 45 all include only W phase windings). The adjacent slots on either side of the single phase slots now have space to accommodate windings of a different phase (either the U phase or V phase). Region 936 highlights the shift for the first path 670 and the second path 672. Likewise, region 938 highlights the shift for the third path 674 and fourth path 676.

With collective reference to FIG. 6, FIG. 8, and FIG. 9, the combination of all three phase windings provided in a double-layer configuration as described above, each of the even-numbered slots of the stator include windings of two different electrical phases in a single slot (i.e., U and V, U and W, or V and W). Conversely, every other slot of the stator (i.e., each of the odd-numbered slots) include windings of a single electrical phase (i.e., U, V, or W).

Figure 10:
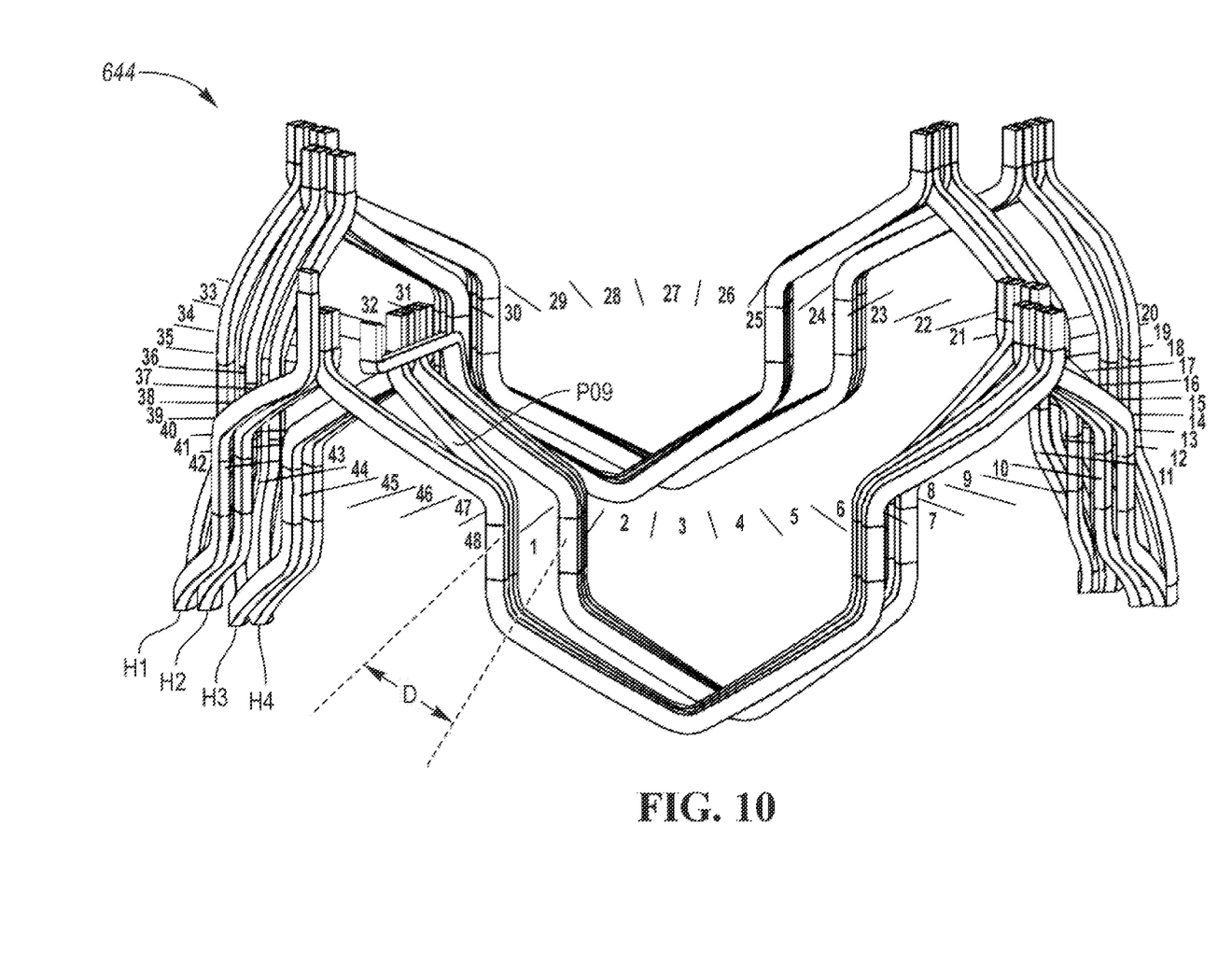
FIG. 10 is a perspective view of select hairpins of a first path arranged for a double-layer winding configuration.

FIG. 10 depicts a perspective view of an example 3D hairpin arrangement of the first path (U1) 644 of the U phase according to the present disclosure. The hairpins are arranged with the crown side down in the figure, and the weld side up. Each of the segments of the first path 644 corresponding to radial layers H1, H2, H3 and H4, are illustrated in FIG. 10. As described above, hairpins P01 through P04 correspond to the innermost radial layer H4. Hairpins P05 through P08 correspond to inner middle radial layer H3. Hairpins P09 through P12 correspond to outer middle radial layer H2. Hairpins P13 through P16 correspond to innermost radial layer H1 The slot numbers are overlaid on the 3D figure to illustrate the slot locations through which the legs of the various hairpins pass. As described, above hairpin P09 is provided as a short-pitch pin with a unique spacing to induce a forward shift D of the outer layers H1, H2. Similar arrangements may be applied to the each of the paths of the various phases such that the hairpins are interleaved to provide a double-layer winding configuration. It should be appreciated that while a shift of one slot is presented herein by way of example, other shift amounts may be suitable to provide double-layer windings depending on the application and the desired electromagnetic properties of the stator.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator core defining circumferentially-arranged slots each having radial pin positions arranged to define radial layers; and
a hairpin winding including a first path of interconnected regular hairpins disposed in the stator core such that a leg portion of each regular hairpin is routed through a radial pin position of each of the slots, wherein each of the regular hairpins has a regular pitch defined by a crown pitch span and two twist pitch spans having same value, wherein at least one uniquely-pitched hairpin is provided along the first path to induce a first shift in a trailing portion of the first path, and wherein the at least one uniquely-pitched hairpin has a unique pitch defined by the crown pitch span, one of the twist pitch spans, and a shorter other twist pitch span having a value less than the same value.

2. The electric machine of claim 1, wherein the first path of interconnected hairpins corresponds to a first electrical phase and the hairpin winding further includes a second path of interconnected hairpins corresponding to a second electrical phase.

3. The electric machine of claim 2, wherein the second path of interconnected hairpins includes at least one uniquely-pitched hairpin along the second path to induce a second shift in a trailing portion of the second path that corresponds to the first shift of the first path.

4. The electric machine of claim 2, wherein at least one leg portion of a hairpin of the first path occupies a common slot with at least one leg portion of a hairpin of the second path.

5. The electric machine of claim 2, wherein the hairpin winding further includes a third path of interconnected hairpins corresponding to a third electrical phase and each of the first path, second path, and third path are interleaved such that a plurality of slots include leg portions corresponding to at least two of the electrical phases.

6. The electric machine of claim 5 wherein every other slot of the stator core includes hairpin windings corresponding to a single electrical phase.

7. The electric machine of claim 5, wherein each of the first path, second path, and third path includes 16 hairpins with one uniquely-pitched hairpin provided along each respective path.

8. The electric machine of claim 1, wherein the first path of the hairpin winding includes a plurality of regular hairpins defining a pitch span of N slots and at least one uniquely-pitched hairpin defining a pitch span of N−1 slots.

9. The electric machine of claim 1, wherein the stator core includes forty-eight slots, eight poles, eight radial pin positions within each slot, and four radial layers.

10. An electric machine comprising:
a stator core defining circumferentially-arranged slots, each slot having radial pin positions arranged in adjacent pairs to define radial layers; and
a first electrical phase of a hairpin winding including a plurality of first hairpins interconnected to each other in series around two inner radial layers, and a plurality of second hairpins interconnected to each other in series around two outer radial layers, the second hairpins being connected at a leading edge to the first hairpins via a uniquely-pitched hairpin, wherein the uniquely-pitched hairpin has a unique pitch defined by a crown pitch span, a first twist pitch span, and a second twist pitch span shorter than the first twist pitch span.

11. The electric machine of claim 10, wherein the uniquely-pitched hairpin induces a first shift in a trailing portion of the first electrical phase of the hairpin winding.

12. The electric machine of claim 10, wherein the plurality of first hairpins are regular hairpins defining a pitch span of N slots and the uniquely-pitched hairpin defines a pitch span of N−1 slots due to the shorter second twist pitch span.

13. The electric machine of claim 10 further comprising a second electrical phase of the hairpin winding interleaved with the first electrical phase such that a plurality of the slots include a hairpin leg portion from both the first and second electrical phases within in a single slot.

14. The electric machine of claim 13 wherein two inner radial layers of the single slot include a hairpin leg portion from the first electrical phase and two outer radial layers of the single slot include a hairpin leg portion from the second electrical phase.

15. The electric machine of claim 13 further comprising a third electrical phase of the of the hairpin winding interleaved with the first electrical phase and the second electrical phase such that such that a plurality of slots include hairpin leg portions corresponding to at least two of the electrical phases.

16. The electric machine of claim 15 wherein every other slot of the stator core includes hairpin windings corresponding to a single electrical phase.

17. An electric machine comprising:
- a stator core defining circumferentially-arranged slots, each slot having radial pin positions arranged in adjacent pairs to define radial layers;
- a first phase of a hairpin winding having a plurality of first hairpins interconnected to each other in series and positioned in at least one inner radial layer, and a plurality of second hairpins interconnected to each other in series and connected to a trailing edge of the first hairpins by a first unique-pitched hairpin and positioned in at least one outer radial layer, wherein the first uniquely-pitched hairpin has a unique pitch defined by a crown pitch span, a first twist pitch span, and a second twist pitch span shorter than the first twist pitch span;
- a second phase of the hairpin winding having a plurality of third hairpins interconnected to each other in series and positioned in at least one inner radial layer, and a plurality of fourth hairpins interconnected to each other in series and connected to a trailing edge of the third hairpins by a second unique-pitched hairpin and positioned in at least one outer radial layer;
- a third phase of the hairpin winding having a plurality of fifth hairpins interconnected to each other in series and positioned in at least one inner radial layer, and a plurality of sixth hairpins interconnected to each other in series and connected to a trailing edge of the fifth hairpins by a third unique-pitched hairpin and positioned in at least one outer radial layer, wherein each of the first phase, the second phase, and the third phase are interleaved such that a plurality of the slots include a hairpin leg portion from both the first and second electrical phases within in a single slot.

18. The electric machine of claim 17 wherein each unique-pitched hairpin induces a shift in a trailing portion of the first phase, the second phase and the third phase.

19. The electric machine of claim 17 wherein every other slot of the stator core includes hairpin windings corresponding to a single electrical phase.

* * * * *